M. M. KARR.
EXPANSION PULLEY.
APPLICATION FILED AUG. 9, 1910.
1,016,158.
Patented Jan. 30, 1912.
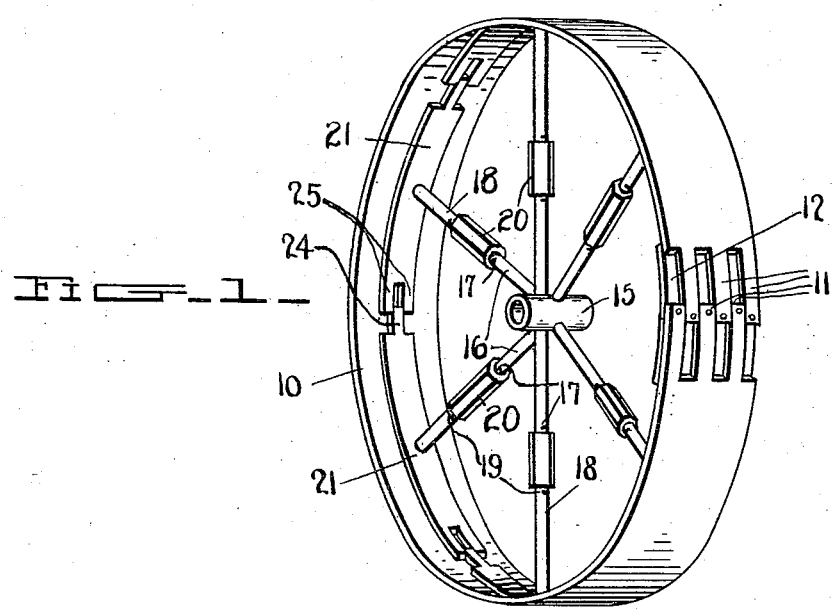
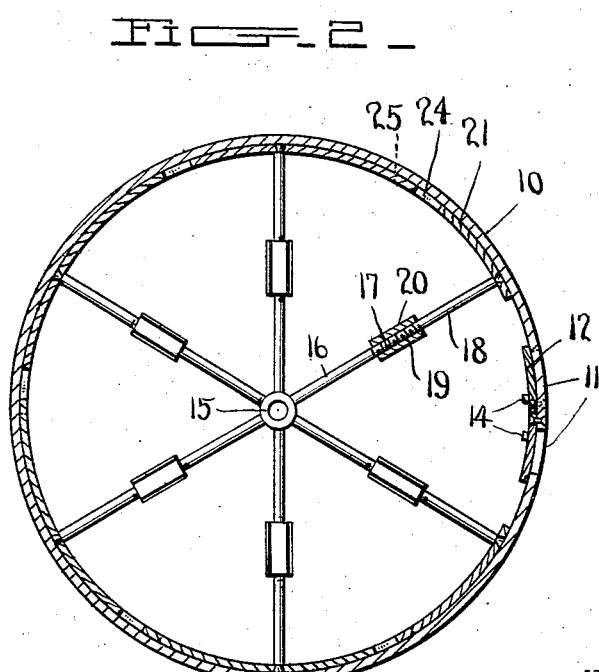
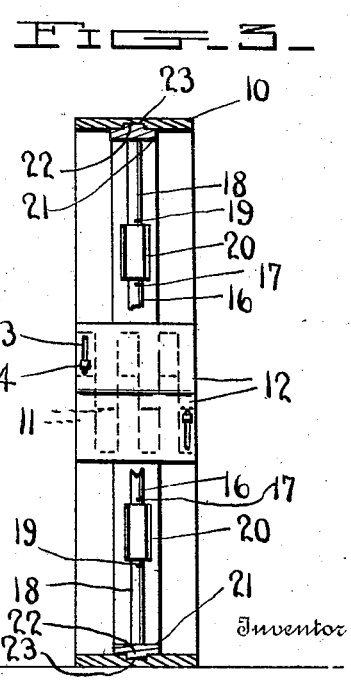
Witnesses
L. B. James
L. N. Gillis
Inventor
M. M. Karr

UNITED STATES PATENT OFFICE.

MILO M. KARR, OF DONIPHAN, NEBRASKA.

EXPANSION-PULLEY.

1,016,158.  Specification of Letters Patent.  Patented Jan. 30, 1912.

Application filed August 9, 1910. Serial No. 576,364.

*To all whom it may concern:*

Be it known that I, MILO M. KARR, a citizen of the United States, residing at Doniphan, in the county of Hall, State of Nebraska, have invented certain new and useful Improvements in Expansion-Pulleys; and I do hereby declare the following to be a full, clear, and exact description of the invention, such as will enable others skilled in the art to which it appertains to make and use the same.

This invention relates to pulleys such as are used for transmitting power to belts trained over said pulleys.

The invention more particularly relates to a pulley which may be expanded within certain limits to vary the size of a pulley whereby a belt may be tightened or the relative speed of a driving pulley varied with reference to a driven pulley.

The principal object of the invention is to improve and simplify the above construction of devices of this character.

With the above and other objects in view the invention consists in general of a pulley having a split rim, a hub, a series of extensible spokes having their inner ends held by said hub, and a series of slidable interlocking plates carried by the outer ends of the spokes and bearing against the inner surface of the rim.

The invention further consists in certain novel details of construction and combinations of parts hereinafter fully described, illustrated in the accompanying drawings, and specifically set forth in the claims.

In the accompanying drawings, like characters of reference indicate like parts in the several views, and Figure 1 is a perspective view of a pulley constructed in accordance with this invention. Fig. 2 is a section taken perpendicularly to the axis of the pulley and midway of the width of the rim. Fig. 3 is a detail sectional view of the pulley.

This pulley is provided with a rim 10 which is preferably made of resilient metal such as spring steel. The rim is bent to the usual annular shape and at each end of said rim plate there are provided interlocking fingers 11 which are slidable with reference to each other so that when the fingers are drawn apart the diameter of the pulley will be increased while, when the fingers move together, the diameter of the pulley will be decreased. Attached to the fingers 11 of each end is a plate 12 which is held inside of the pulley rim and the plate which is attached to one set of fingers normally projects across the other set of fingers. Each of these plates 12 is provided with a slot 13 wherethrough passes a set screw 14 which serves to hold the respective plate to the rim.

At 15 is a hub over which radiate the spokes of the pulley. Each of these spokes comprises an inner section 16 which is held by the hub and is provided with an outer threaded end 17. The spokes also comprise outer sections 18 the inner ends of which are threaded as at 19, the threads being of opposite hand to the threads of the ends 17 so that a right and left handed threaded sleeve 20 may be engaged over these ends thus enabling the sections 16 and 18 to be forced apart or drawn together in accordance with the drive of rotation of the sleeve 20.

On the outer ends of the sections 18 there are provided certain plates 21 each of which has an outer centrally disposed rib 22 which is fitted within a groove 23 formed around the inner surface of the rim 10 so that these plates are slidable with reference to said rim and also with reference to each other. Furthermore each of these plates has a finger 24 formed on one end which is slidably engaged between fingers 25 formed on the adjacent end of the next adjacent plate. The plates are thus slidably interlocking and are carried by the outer ends of the spokes so that they bear against the inner surface of the rim.

In the operation of the device let it be supposed that the pulley is in the shape shown in Fig. 1, this being the fully expanded position. If it is desired to decrease the diameter of the pulley the sleeves 20 are rotated so that the spoke sections 16 and 18 are drawn together. This relieves the strain of the rim 10 and by reason of the elasticity of the rim the said rim contracts and the fingers 11 move inward of each other and the plates 12 consequently separate. At the same time the plates 21 also move toward each other, the fingers 24 and 25 sliding together.

There has thus been provided a simple and efficient device of the kind described and for the purpose specified.

It is obvious that minor changes may be made in the form and construction of this invention without departing from the material principles thereof. It is not therefore desired to confine the invention to the exact form herein shown and described, but it is wished to include all such as properly come within the scope of the appended claims.

Having thus described the invention what is claimed as new, is:—

1. In a pulley, a split rim, a hub, a series of extensible spokes having their inner ends held by said hub, and a series of slidably interlocking plates carried by the outer ends of the spokes and bearing against the inner surface of said rim.

2. In a pulley, a rim comprising a plate of annular form, each end of the plate being provided with slidably interlocking fingers, a hub, a series of extensible spokes having their inner ends held by said hub, and a series of slidably interlocking plates carried by the outer ends of the spokes and bearing against the inner surface of said rim.

3. In a pulley, a rim comprising a plate of annular form, each end of the plate being provided with slidably interlocking fingers, a hub, a series of extensible spokes having their inner ends held by the hub, and a series of interlocking plates carried by the outer ends of the spokes and bearing against and having interlocking engagement with the inner surface of said rim.

4. In a pulley, a split rim, a hub, a series of extensible spokes having their inner ends held by said hub, a series of slidably interlocking plates carried by the outer ends of the spokes and bearing against and having interlocking engagement with the inner surface of said rim.

5. In a pulley, a split rim having interlocking fingers formed at the ends thereof, plates disposed against the inner face of the rim and attached to the fingers of each end of said rim by a pin and slot connection, each plate projecting across the other set of fingers, a hub, a series of extensible spokes having their inner ends held by the hub, and a series of interlocking plates carried by the outer ends of the spokes and bearing against and having interlocking engagement with the inner surface of said rim.

In testimony whereof, I affix my signature, in presence of two witnesses.

MILO M. KARR.

Witnesses:
A. D. BURGER,
W. H. McDOWELL.

Copies of this patent may be obtained for five cents each, by addressing the "Commissioner of Patents, Washington, D. C."